US008888154B2

(12) United States Patent
Tvetene

(10) Patent No.: US 8,888,154 B2
(45) Date of Patent: Nov. 18, 2014

(54) SOD ROLL PICKUP MECHANISM

(75) Inventor: Gregg Tvetene, Billings, MT (US)

(73) Assignee: Trebro Holding, Inc., Billings, MT (US)

( * ) Notice: Subject to any disclaimer, the term of this patent is extended or adjusted under 35 U.S.C. 154(b) by 0 days.

(21) Appl. No.: 14/130,280

(22) PCT Filed: Jul. 20, 2012

(86) PCT No.: PCT/US2012/047720
§ 371 (c)(1),
(2), (4) Date: Mar. 25, 2014

(87) PCT Pub. No.: WO2013/013202
PCT Pub. Date: Jan. 24, 2013

(65) Prior Publication Data
US 2014/0197650 A1    Jul. 17, 2014

Related U.S. Application Data

(60) Provisional application No. 61/509,728, filed on Jul. 20, 2011.

(51) Int. Cl.
*B65H 3/22* (2006.01)
*B66C 1/22* (2006.01)
*A01B 45/04* (2006.01)

(52) U.S. Cl.
CPC ................. *B66C 1/22* (2013.01); *A01B 45/045* (2013.01)
USPC ............................................ 294/61; 294/128

(58) Field of Classification Search
CPC ........... B65H 3/22; A01B 45/04; A01B 77/00
USPC ............ 294/61, 8.6, 128, 129, 127; 271/18.3; 172/20, 21, 620; 414/911, 796.9; 111/901, 200
See application file for complete search history.

(56) References Cited

U.S. PATENT DOCUMENTS

| 4,372,548 | A | * | 2/1983 | Aurich et al. | ................. | 271/18.3 |
| 5,114,132 | A | * | 5/1992 | Arato et al. | ................... | 271/18.3 |
| 5,513,945 | A | * | 5/1996 | Hartmann et al. | ............ | 414/626 |
| 6,112,680 | A | * | 9/2000 | Hummer | ........................ | 111/200 |
| 6,296,063 | B1 | * | 10/2001 | Tvetene et al. | .................. | 172/19 |

(Continued)

FOREIGN PATENT DOCUMENTS

EP         2716585 A2 *  4/2014    ............... B65H 3/22

*Primary Examiner* — Dean Kramer
*Assistant Examiner* — Gabriela Puig
(74) *Attorney, Agent, or Firm* — Antoinette M. Tease

(57) ABSTRACT

A sod roll picker including a pair of right facing spear bar assemblies and a pair of left facing spear bar assemblies. Each of the right and left facing spear bar assemblies includes a spear bar, a plurality of spears secured to the spear bar, and a guide roller disposed on each end of the spear bar assembly. The picker also includes a base frame having a pair of sidewalls connected by a pair of end walls. Each end wall includes a pair of right guide paths configured to receive the guide rollers of the right facing spear bar assemblies and a pair of left guide paths configured to receive the guide rollers of the left facing spear bar assemblies. The picker also includes a right spear bar linkage interconnecting the right facing spear bar assemblies and a left spear bar linkage interconnecting the left facing spear bar assemblies.

14 Claims, 14 Drawing Sheets

(56) References Cited

U.S. PATENT DOCUMENTS

| | | | |
|---|---|---|---|
| 6,309,001 B1 * | 10/2001 | Sherwin et al. | 294/61 |
| 6,364,027 B1 * | 4/2002 | Tvetene et al. | 172/1 |
| 6,681,864 B2 * | 1/2004 | Tvetene et al. | 172/20 |
| 7,066,277 B2 * | 6/2006 | Hendriks et al. | 172/19 |
| 8,141,920 B2 * | 3/2012 | Butler et al. | 294/61 |
| 8,714,608 B2 * | 5/2014 | Cho | 294/61 |
| 2005/0000705 A1 * | 1/2005 | Brouwer et al. | 172/19 |

* cited by examiner

| PARTS LIST | | | |
|---|---|---|---|
| ITEM | QTY | PART# | DESCRIPTION |
| 15 | 4 | B0.5X1.75 | SCREW CAP .500 X 1.75 |
| 14 | 18 | B0.39.1.00 | SCREW CAP .375 X 1.00 |
| 13 | 9 | B0.25.0.75 | SCREW CAP .250 x .750 |
| 12 | 1 | AU100021 | STACKER CARRIAGE FRAME, ROLLER SHAFT |
| 11 | 2 | AU100386 | SLIDE GUIDE ASSY |
| 10 | 1 | AU100801 | MOTOR CHAIN GUARD |
| 9 | 1 | AU100079 | DR/12 CHAIN 80 CHAIN 30 LINKS TOTAL |
| 8 | 1 | AU100861-A | STACKER ASSEMBLY |
| 7 | 1 | AU100867-A | ROTATE MOUNT ASSY |
| 6 | 1 | AU100947-A | CARRIAGE UP-DOWN ASSY |
| 5 | 2 | B0SS31.25 | SPROCKET 20BSS9 1.25 KEYED |
| 4 | 1 | B0SDS25 | SPROCKET 80SDS25 |
| 3 | 1 | B0SDS19 | SPROCKET 80SDS19 |
| 2 | 2 | 3102 | KEY STOCK 1/4" x 1 1/2" |
| 1 | 2 | 28177 | BEARING 2 1W BLK 1.25 |

| PARTS LIST | | | |
|---|---|---|---|
| ITEM | QTY | PART# | DESCRIPTION |
| 32 | 2 | 10T4B | FTG SUPER SWIVEL MORB-MORS |
| 30 | 4 | N1.25 | 1-1/4" HEX NUT |
| 29 | 1 | MART132G | BUSHING GD SDSX12.50 1 1/4 |
| 28 | 1 | MART132A | BUSHING GD SDSX100 1" |
| 27 | 4 | LW1.25HARD | WASHER LOCK 1 HARDENED |
| 26 | 8 | LW0.62HARD | WASHER LOCK .625 HARD |
| 25 | 4 | LOAD101 | LOAD RUNNER FLANGED ECCEN STUD |
| 24 | 4 | N1.50 | NUT NYLOCK .500 |
| 23 | 18 | LN1.38 | NUT NYLOCK .375 |
| 22 | 6 | LN1.25 | NUT NYLOCK .250 |
| 21 | 4 | FW0.5HARD | WASHER FLAT .500 HARDENED |
| 20 | 6 | FW0.38HARD | WASHER FLAT .375 HARDENED |
| 19 | 6 | FW0.25 | WASHER FLAT .250 |
| 18 | 2 | BFS8400-10-12 | SEAL LOCK 100 O-RING |
| 17 | 2 | BFS2700-UN-06-06 | FTG MORS - MORS BULKHEAD STRT |
| 16 | 8 | B0.62.1.75.G10.8 | SCREW CAP .625 X 1.75 GR10.8 |

FIG. 14

SOD ROLL PICKUP MECHANISM

CROSS-REFERENCE TO RELATED APPLICATIONS

This application claims the benefit of U.S. Provisional Application No. 61/509,728, filed Jul. 20, 2011, the disclosure of which is hereby incorporated by reference in its entirety.

BACKGROUND

A typical a sod harvester cuts a slab of sod and rolls each slab into a cylindrical roll. The sod rolls are then transferred to and stacked on a pallet for delivery. Various mechanized sod handling equipment is known in the prior art. Of particular interest here, are mechanized devices for picking up rolls of sod. For example, U.S. Pat. Nos. 6,296,063 and 6,364,027 both disclose a sod roll pickup mechanism that incorporates a plurality of retractable spears for piercing engagement with a set of sod rolls. Pairs of spear sets extend at an angle with respect to each other from the pickup mechanism to pierce the rolls, thereby capturing the sod rolls. Once the sod rolls are captured by the spears they may be lifted and placed on a carrier or pallet, for example.

In early sod roll pickup mechanisms, the spears are extended and retracted by a power drive mechanism comprising a series of sprockets and chains driven by a motor, such as a hydraulic motor. While the chain and sprocket arrangement of previous sod roll pickup mechanism's is satisfactory for operating the spears, multiple chains and sprockets require constant maintenance to prevent premature failure. Furthermore, a chain drive spear mechanism must operate within certain speed limits to ensure reliability.

Accordingly, there is a need for an improved sod roll pickup mechanism that can operate at higher speeds with increased reliability and less maintenance.

SUMMARY

Provided herein is a sod roll picker including a pair of right facing spear bar assemblies and a pair of left facing spear bar assemblies. Each of the right and left facing spear bar assemblies includes a spear bar, a plurality of spears secured to the spear bar, and a guide roller disposed on each end of the spear bar assembly. The picker also includes a base frame having a pair of sidewalls connected by a pair of end walls. Each end wall includes a pair of right guide paths configured to receive the guide rollers of the right facing spear bar assemblies and a pair of left guide paths configured to receive the guide rollers of the left facing spear bar assemblies. The picker may further include a pair of spear guide plates supported on the base frame. The picker may still further include a right spear bar linkage interconnecting the right facing spear bar assemblies and a left spear bar linkage interconnecting the left facing spear bar assemblies.

BRIEF DESCRIPTION OF THE DRAWINGS

The accompanying drawings, which are incorporated in and constitute a part of this specification, illustrate embodiments of a sod roll pickup mechanism and together with the description, serve to explain the principles and operation thereof. Like items in the drawings are generally referred to using the same numerical reference.

FIG. 14 is an enlarged view of the bill of materials shown in FIG. 8.

DETAILED DESCRIPTION

Described herein is an improved sod roll pickup mechanism that provides increased speed and reliability. The sod roll mechanism operates with fewer moving parts than previous sod roll pickup mechanisms. The sod roll mechanism includes a pair of hydraulic cylinders, each of which actuates a pair of spear bar assemblies. By using hydraulic cylinders rather than the previous known sprocket-and-chain arrangements, the number of moving parts is reduced, and maintenance is virtually eliminated.

Figure 1:
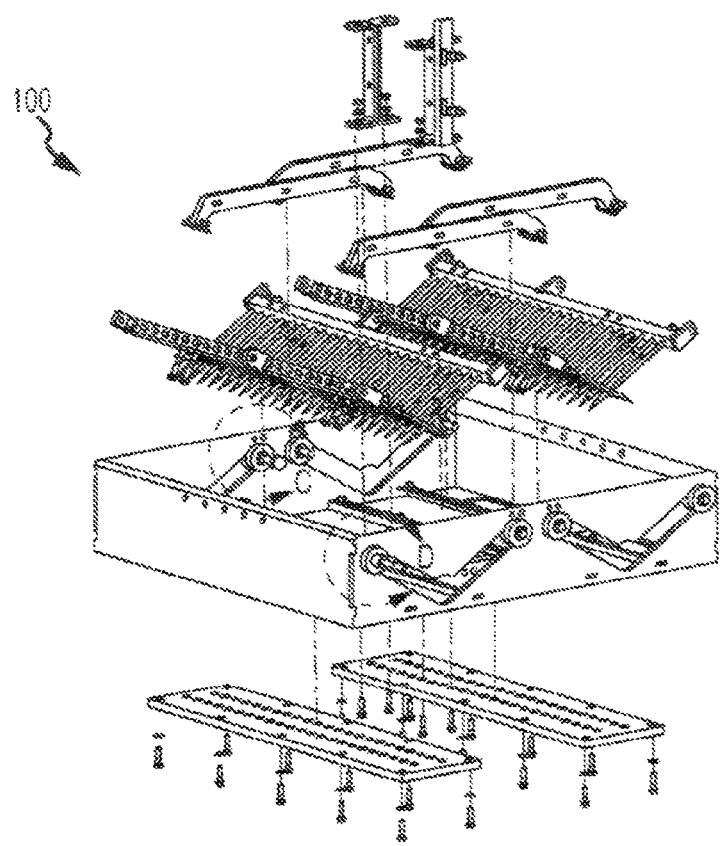
FIG. 1 is an exploded perspective view of a sod roll pickup mechanism according to an exemplary embodiment.
Figure 2:
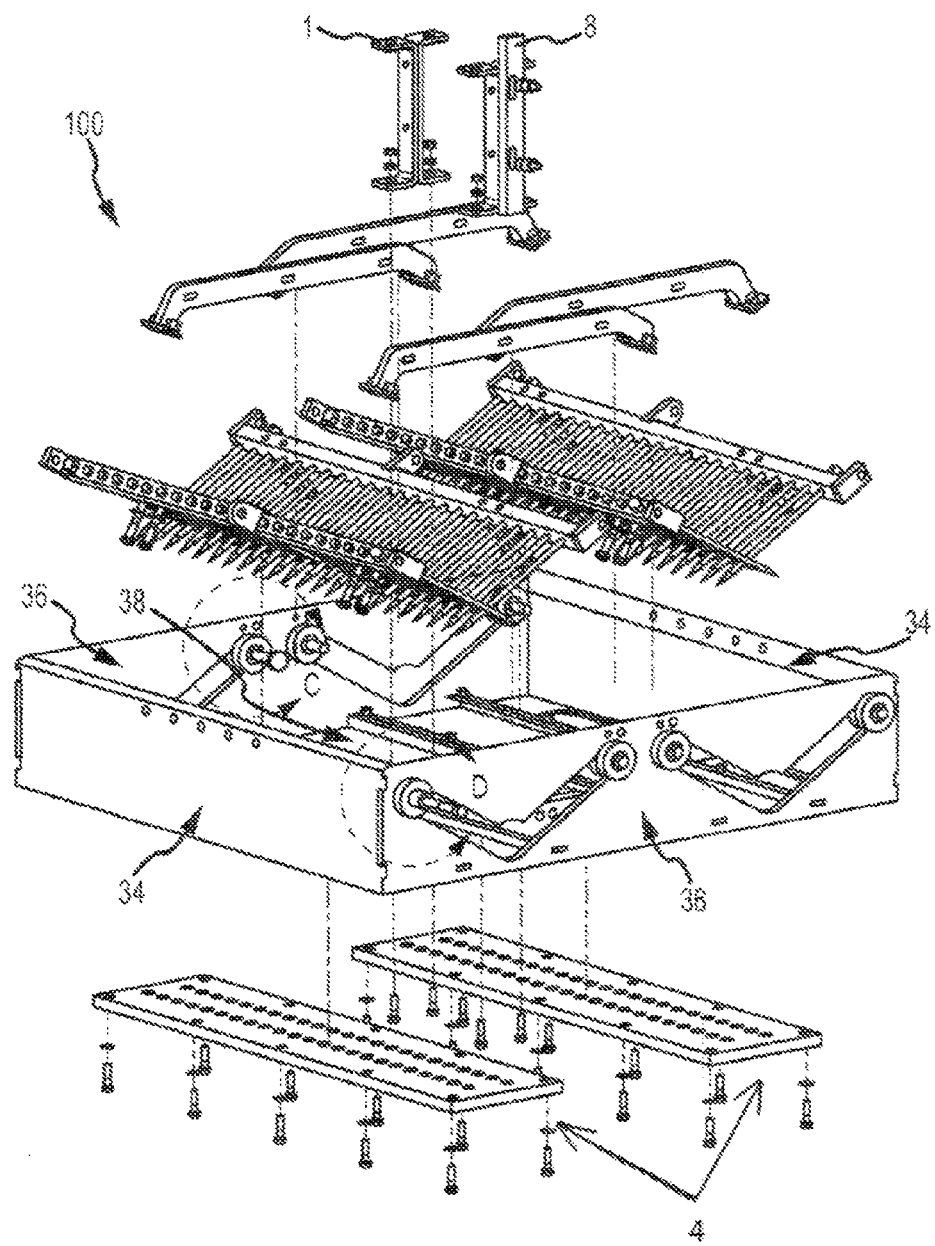
FIG. 2 is an enlarged exploded perspective view of the sod roll pickup mechanism shown in FIG. 1.

FIG. 1 is a multi-view assembly drawing of a sod roll picker mechanism 100, also referred to herein as a stacker base assembly. Each of the views in FIG. 1 is enlarged in subsequent FIGS. 2, 6, and 7, for clarity. With further reference to FIG. 2, the stacker base assembly 100 includes a base frame weldment 5 that comprises side walls 34 that are connected by end walls 36. End walls 36 support two pairs of spear bar assemblies 13. The bottom side of base assembly weldment 5 supports a pair of spear guide plates 4, each configured to receive the spears of a respective pair of spear bar assemblies 13. The spear guide plates 4 help keep the individual spears at the correct angle and provide additional support to the spears as they are extended into a sod roll. Extending upward from bottom panel 38 are a pair of support members 1 which connect the bottom panel 38 to upper cross support 40 (see FIG. 4).

Figure 3:
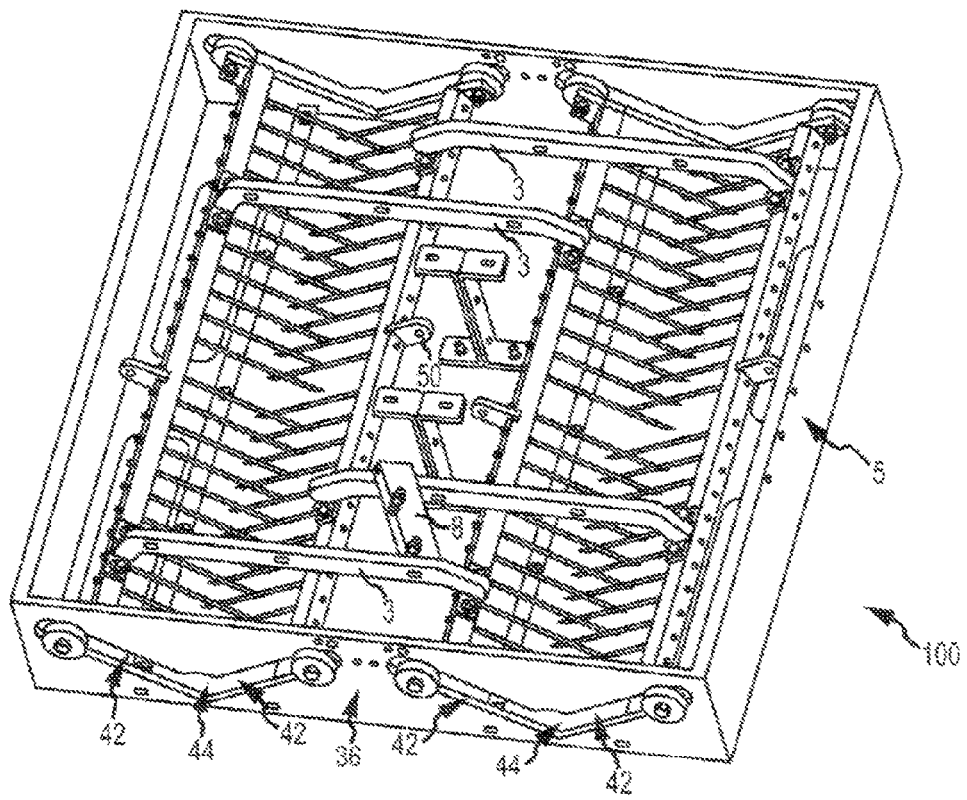
FIG. 3 is an assembled perspective view of the sod roll pickup mechanism shown in FIGS. 1 and 2.

Turning now to FIG. 3, it can be appreciated that each spear bar assembly 13 includes a guide roller 2 disposed on each end of the bar assembly. End plates 36 include intersecting guide paths 42 which correspond to an associated pair of guide bar assemblies 13. Guide rollers 2 are each captured in an associated guide path 42. Each pair of guide paths 42 intersect at an enlarged region 44 which is sized to accept the overall diameter of the guide rollers 2. Each guide roller 2 includes larger shoulder diameters 46 which create channel 48 therebetween. Accordingly, guide roller 2 may be inserted into enlarged region 44 during the assembly process and moved upwards along the guide channel 42, thereby capturing the guide rollers 2. As can be seen in FIG. 3, each pair of spear bar assemblies 13 includes left-pointing spears and right-pointing spears. Also shown in FIG. 3, the left-pointing spears of each pair are connected via a spear bar linkage 3, and similarly, the right-pointing spear bars are connected with spear bar linkages 3. In this case, the spear bar linkages 3 are the same for the left- and right-pointing spears. Accordingly, the spear bars are held at the proper orientation between the linkages and guide rollers.

Figure 4:
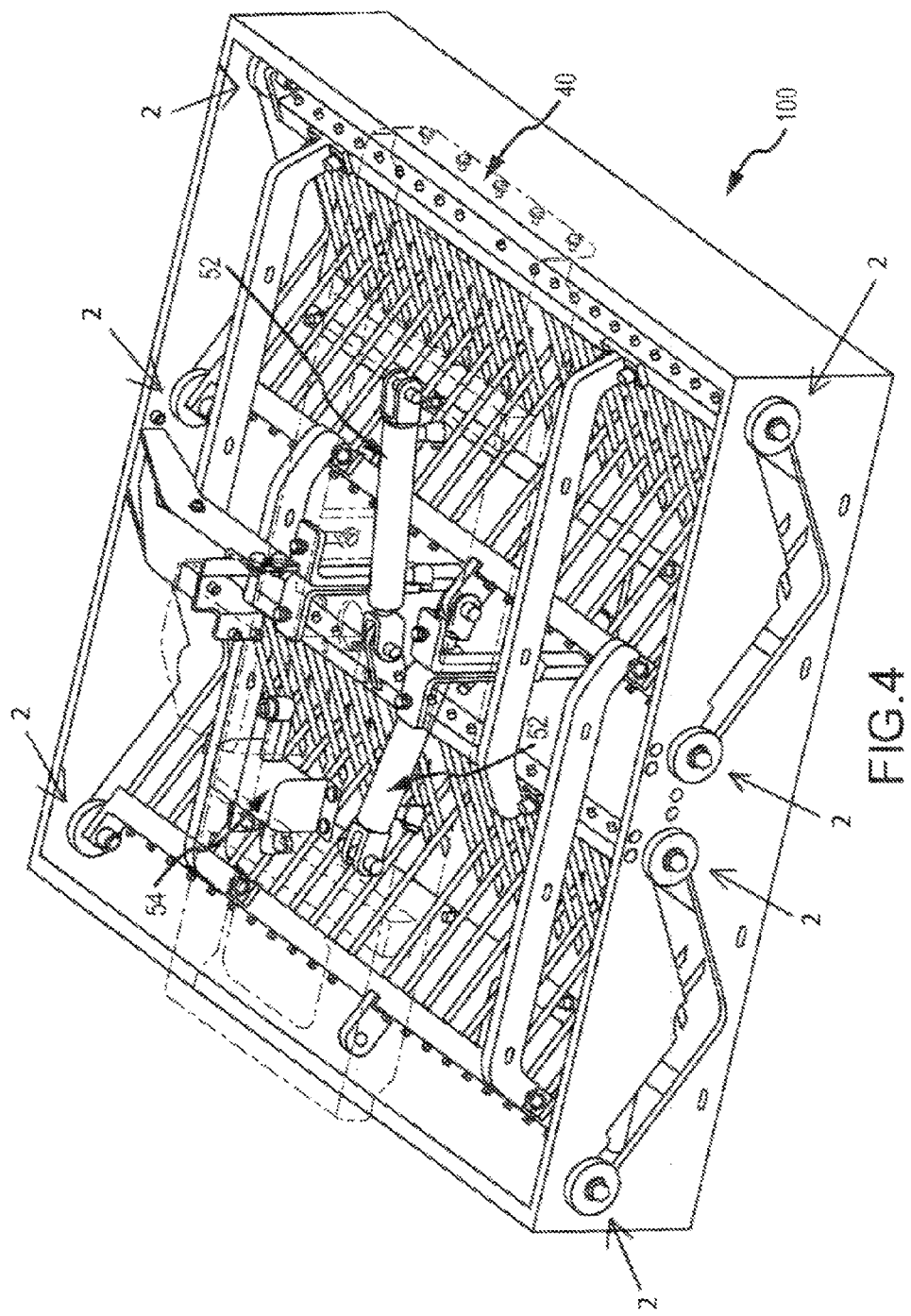
FIG. 4 is an assembled perspective view of the sod roll pickup mechanism shown in FIGS. 1-2 including the spear cylinder cross support.

Because both of the left-facing and right-facing spear bar assemblies are connected together, a single actuator may be employed to extend and retract the spears, such as hydraulic cylinders 52 shown in FIG. 4. Hydraulic cylinders 52 attach to a respective spear bar assembly at a clevis mount 50. The opposite ends of cylinders 52 are attached at a clevis mount on cross member 40. Therefore, in operation, the left-facing spear bar assemblies 13 are actuated together by cylinder 52, pushing the leftmost spear bar assembly 13 which is tied by linkage 3 to the other left-facing spear bar assembly 13. Accordingly, a single movement of cylinder 52 actuates both left-facing spear bar assemblies 13. The right-facing spear bars assemblies 13 are actuated in a similar fashion.

Referring again to FIGS. 2 and 3, the position of the spear bar assemblies in either the retracted or extended position is monitored by a pair of proximity sensors which are mounted to the bottom panel 38 with a proximity mount bracket 8. It can be appreciated that each of the proximity sensors are mounted in a slot such that their position may be adjusted as desired. Accordingly, an appropriate control system may be incorporated with the sod roll picker mechanism to actuate the cylinders at the appropriate time in relation to the rest of the automation. This may be accomplished in part with a hydraulic control valve 54 which, in this case, is mounted to cross member 40.

Figure 5:
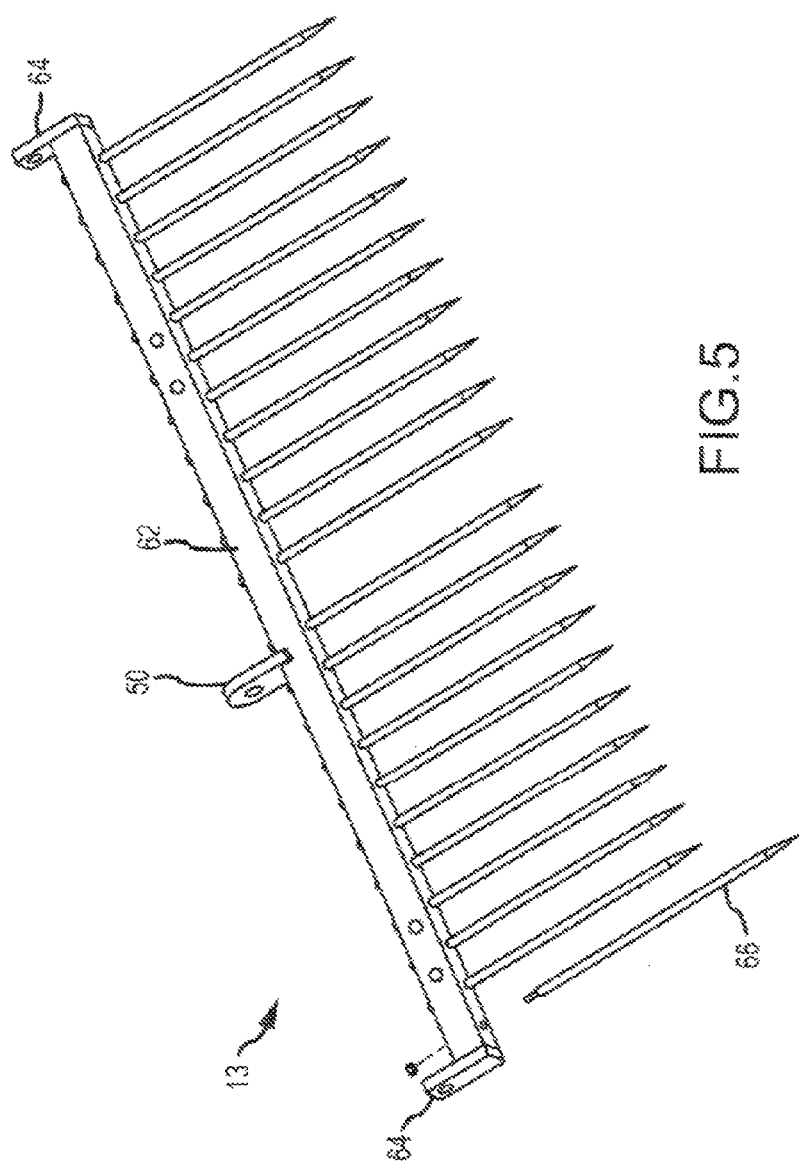
FIG. 5 is a perspective view of an exemplary spear bar assembly.

FIG. 5 illustrates the construction of each spear bar assembly 13. Spear bar assembly 13 includes a bar 62 with a plurality of holes extending therethrough. Bar 62 includes a pair of mounting tabs 64 which provide a mounting point for guide rollers 2, as well as a clevis mount 50. The bar 62, clevis mount 50, and end tabs 64 may be welded together to create a weldment as is shown in FIG. 5. A plurality of spears 66 are inserted into a respective hole and secured therein with an appropriate fastener such as a threaded nut.

Figure 6:
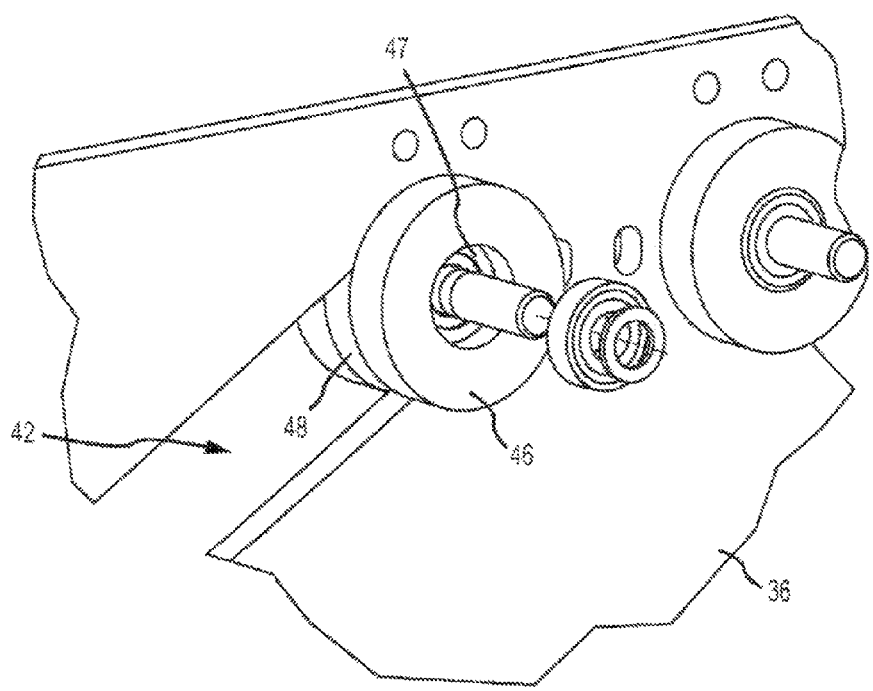
FIG. 6 is an enlarged partial perspective view of the guide roller installation as viewed from inside the sod roll pickup mechanism.
Figure 7:
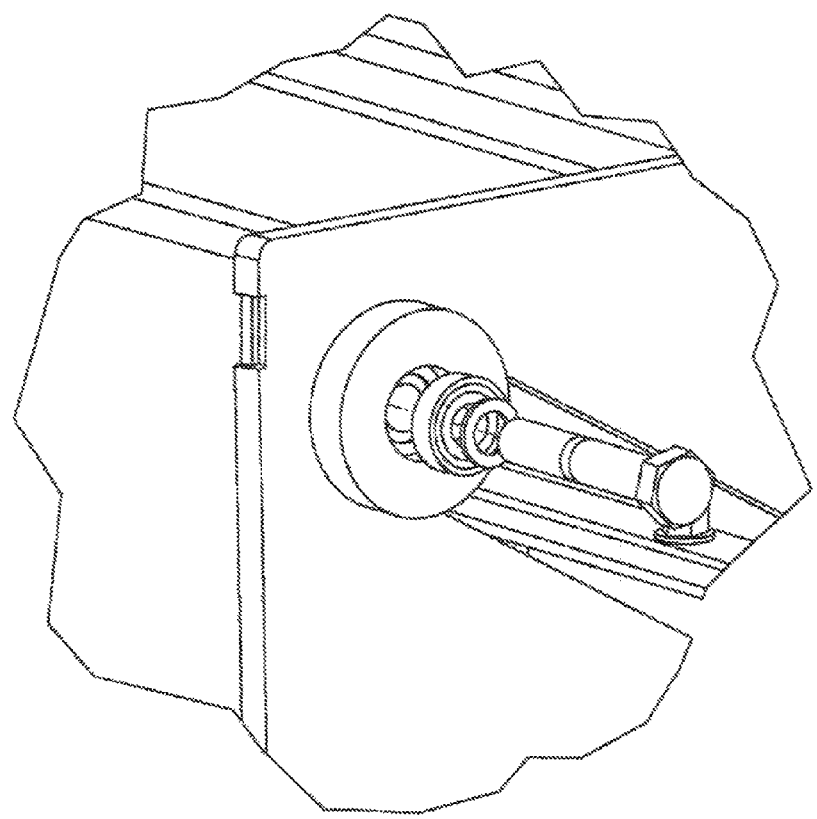
FIG. 7 is an enlarged partial perspective view of the guide roller installation as viewed from outside the sod roll pickup mechanism.

With reference to FIGS. 6 and 7, the assembly of guide rollers 2 into grooves 42 and simultaneously onto spear bar assemblies 13 is shown. Each guide roller 2 includes a counter bore 47 which receives a corresponding bearing. The guide roller 2 is secured in the assembly with a hex cap screw which extends through the bearing, guide roller and into mounting tab 64 of one of the spear bar assemblies. The guide roller 2 is secured with a nut that is fastened to hex cap screw. Guide rollers 2 may be formed from any suitable wear-resistant material such as plastics or metals, for example. Example plastics may include ultra-high molecular weight (UHMW) polyethylene, Delrin, or the like. Examples of metal may include bronze, steel, or the like.

As perhaps best shown in FIG. 2, the guide roller channels 42 are angled at approximately 90 degrees with respect to each other. The spear bar assemblies 13 are angled with respect to each other at approximately the same angle as the angle of the guide roller channels 42. While shown here as approximately 120 degrees, the angle may vary.

It should be appreciated throughout the description of the sod roll picking mechanism that various components may be joined together by various methods such as known in the art, including, for example and without limitation, the use of threaded fasteners such as screws and nuts, rivets, and the like. Furthermore, various weldment assemblies may be used such as in the base frame weldment 5. The side panels and end panels may be joined by welding, spot welding, or the like. Also, various components are generally made of a metal such as steel, which is easily welded and machined. However, some components such as guide rollers and the spear bar guide plates 4 may be formed of heavy-duty plastics as mentioned above.

Figure 8:
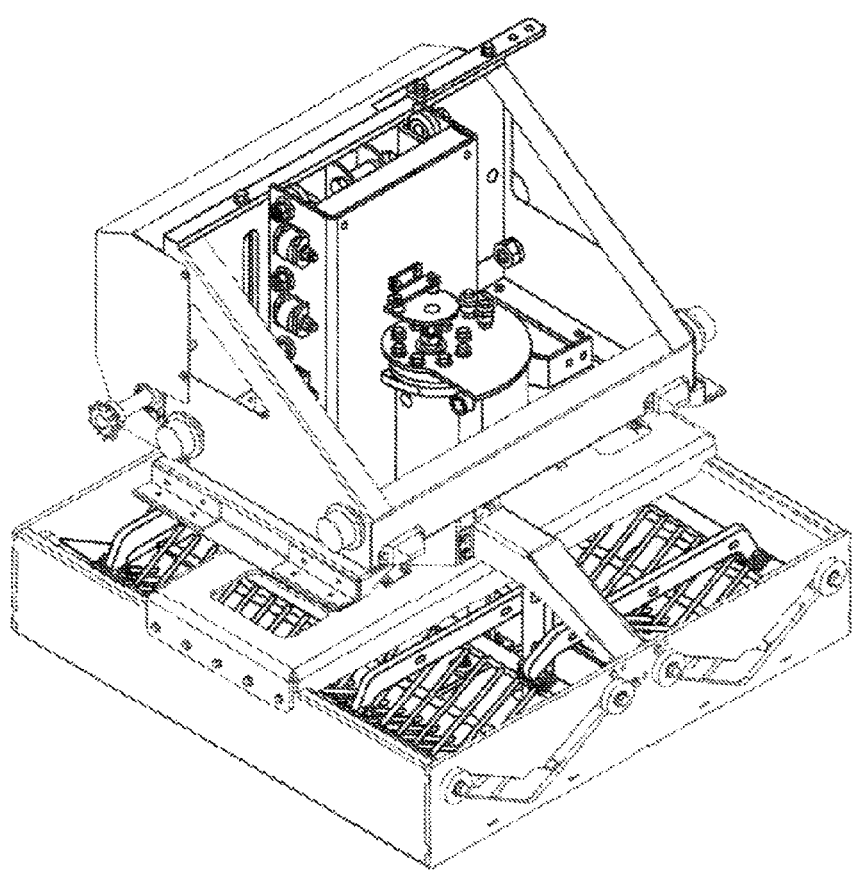
FIG. 8 is a multi-view assembly drawing of the sod roll pickup mechanism attached to a stacker carriage.
Figure 9:
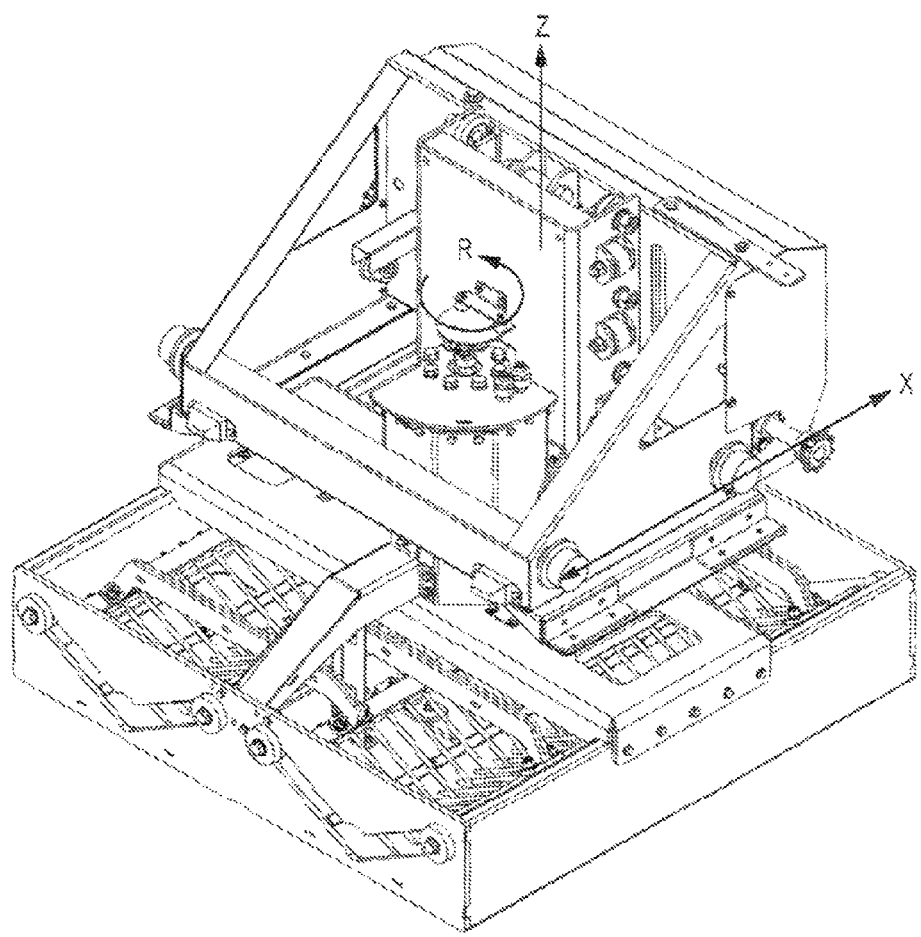
FIG. 9 is an enlarged perspective view of the sod roll pickup mechanism and carriage assembly shown in FIG. 8 as viewed from the front.
Figure 10:
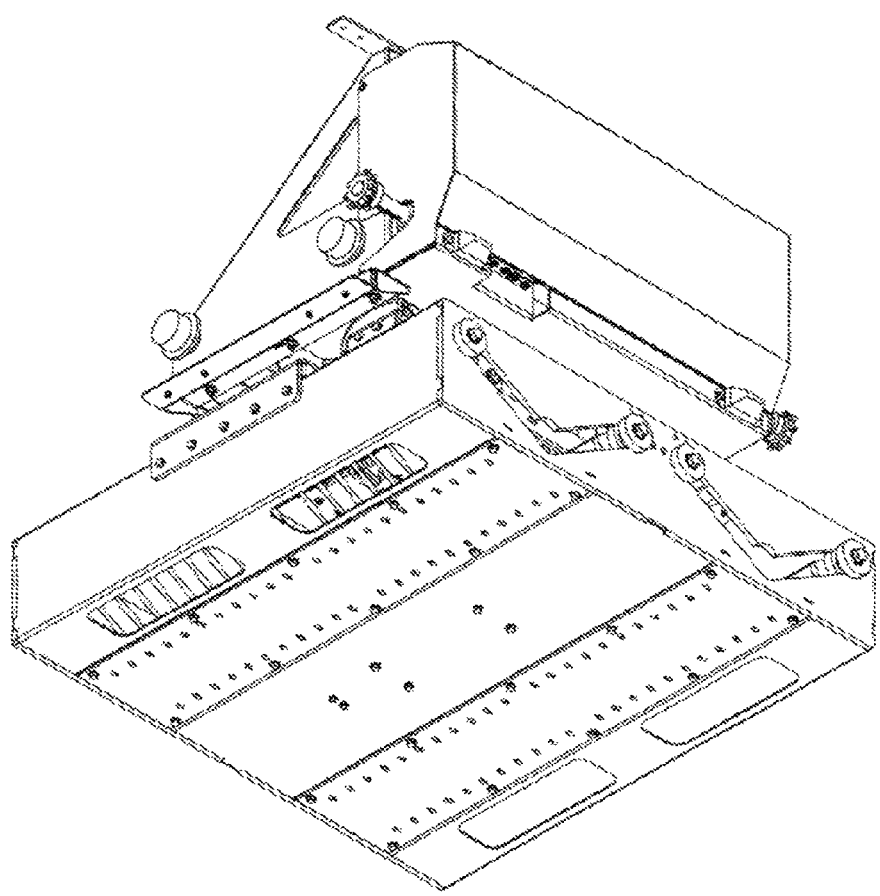
FIG. 10 is an enlarged perspective view of the sod roll pickup mechanism and carriage assembly shown in FIG. 8 as viewed from underneath.
Figure 11:
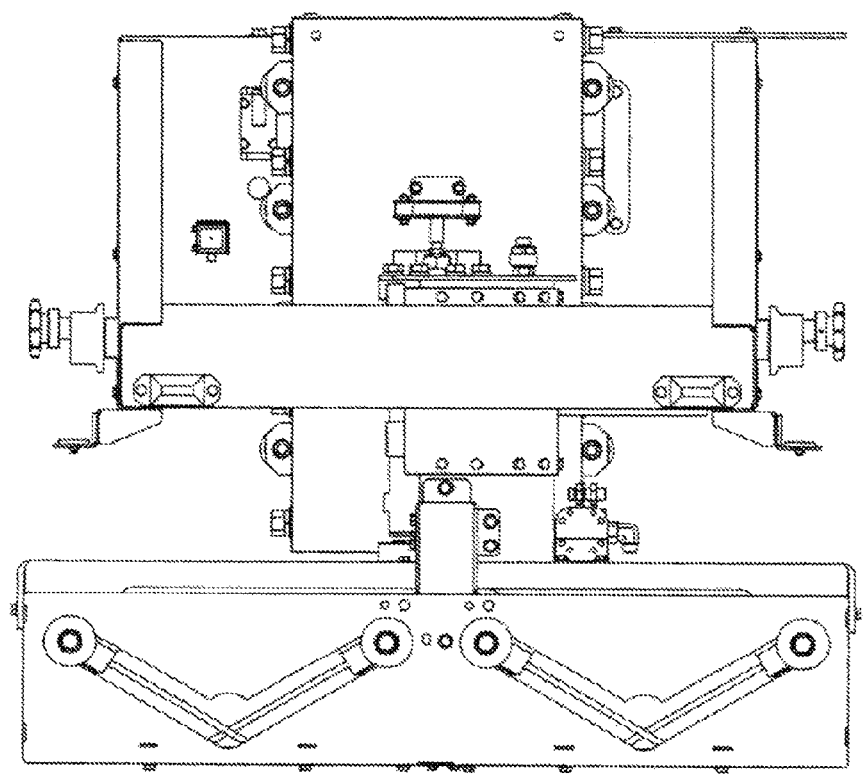
FIG. 11 is an enlarged plan view in elevation of the sod roll pickup mechanism and carriage assembly shown in FIG. 8 as viewed from the front.
Figure 12:
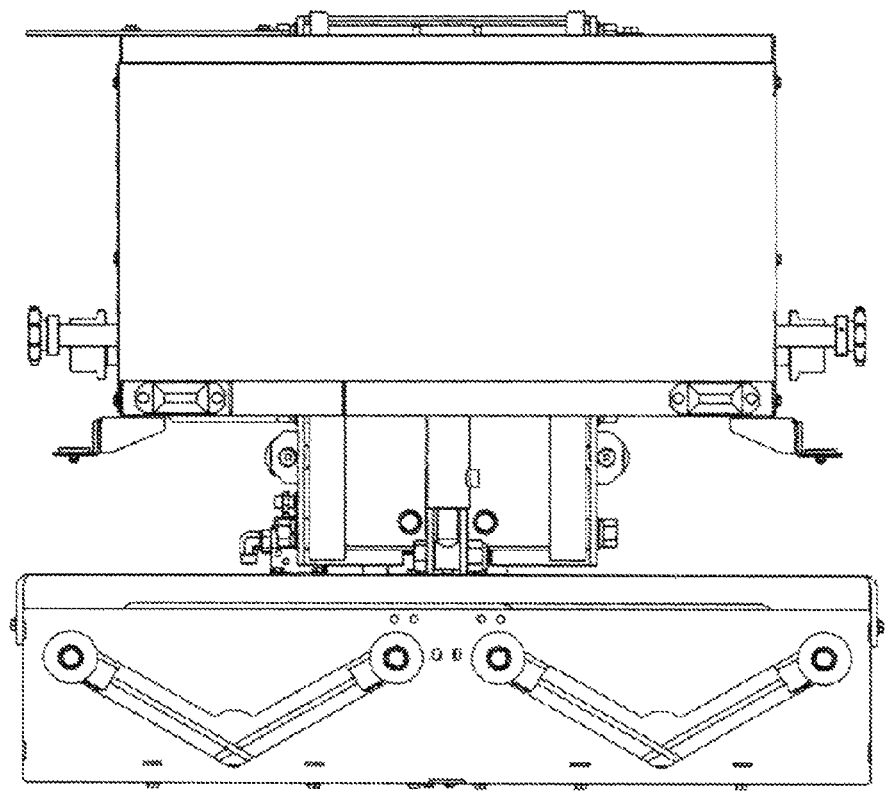
FIG. 12 is an enlarged plan view in elevation of the sod roll pickup mechanism and carriage assembly shown in FIG. 8 as viewed from the back.
Figure 13:
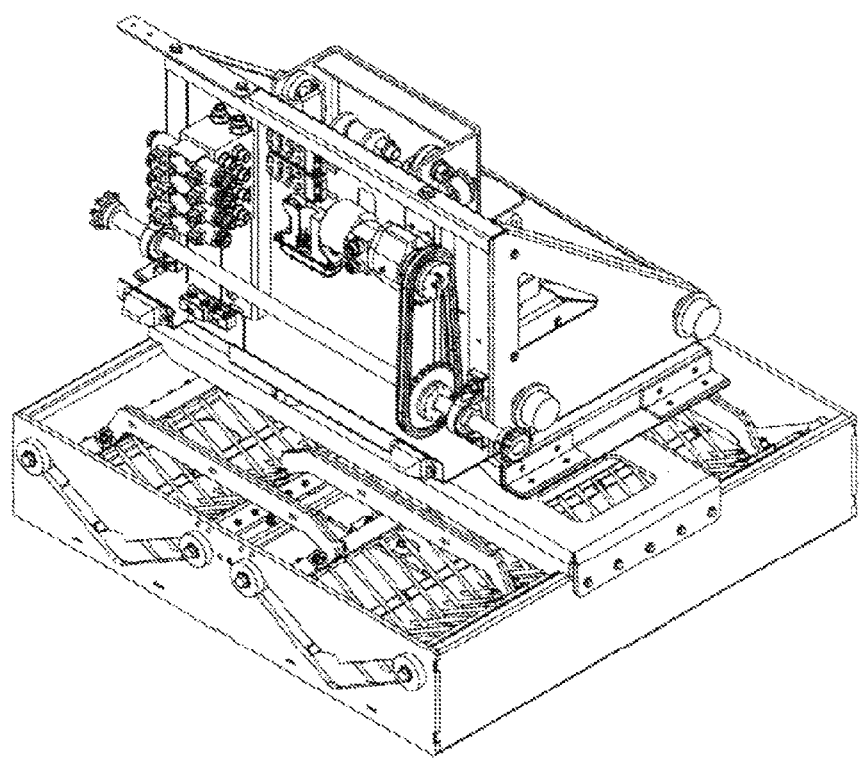
FIG. 13 is an enlarged perspective view of the sod roll pickup mechanism and carriage assembly shown in FIG. 8 as viewed from the back.

FIG. 8 is a multi-view assembly drawing of the sod roll picker assembly attached to a carriage. These additional views illustrate the picker from different angles and serve to explain the operation of the picker device. The various views in FIG. 8 are enlarged and shown in the subsequent FIGS. 9-14 that follow. For example, FIG. 9 illustrates the relationship of picker assembly 100 to a carriage assembly. The carriage assembly provides an up-down or vertical axis as well as a rotational axis. The carriage assembly also moves along a horizontal axis via rollers which engage a channel on the overall sod machine. The vertical axis is indicated in FIG. 9 as axis Z, while the horizontal axis X is shown with respect to rollers, and rotational axis R is implemented by a rotational actuator.

In operation, the pick mechanism 100 is lowered onto a set of sod rolls by moving the carriage axis in the Z direction. Once the pick head is in place adjacent the sod rolls, the spear bar assemblies are actuated to the extended position, wherein the spears engage or pierce the sod rolls, thereby capturing the sod rolls on the spears. Once the rolls are captured, the pick mechanism 100 is raised again by actuating the carriage in direction Z. At this point, the entire carriage may be translated along the X axis to move the set of sod rolls into position over a pallet, for example. Once in position over the pallet, the Z axis may again be lowered to put the sod rolls in position, at which point the spear bar assemblies are retracted, thereby releasing the sod rolls. This set of operations is repeated to place multiple sod roll sets onto a pallet. However, on the subsequent stacking sequence, the pick head 100 may be rotated 90 degrees about axis R, such that the orientation of sod rolls is alternated between layers on a pallet, thereby creating a more stable pallet load.

Accordingly, the sod roll pickup mechanism has been described with some degree of particularity directed to the exemplary embodiments. It should be appreciated, though, that modifications or changes may be made to the exemplary embodiments without departing from the inventive concepts contained herein.

What is claimed is:
1. A sod roll picker, comprising:
a pair of right facing spear bar assemblies and a pair of left facing spear bar assemblies, each of the right and left facing spear bar assemblies including:
a spear bar;
a plurality of spears secured to the spear bar; and
a guide roller disposed on each end of the spear bar assembly; and
a base frame including a pair of sidewalls connected by a pair of end walls, each end wall including a pair of right guide paths configured to receive the guide rollers of the right facing spear bar assemblies and a pair of left guide paths configured to receive the guide rollers of the left facing spear bar assemblies.

2. The sod roll picker according to claim 1, further comprising a pair of spear guide plates supported on the base frame.

3. The sod roll picker according to claim 1, further comprising a right spear bar linkage interconnecting the right facing spear bar assemblies and a left spear bar linkage interconnecting the left facing spear bar assemblies.

4. The sod roll picker according to claim 3, further comprising an actuator connected to each of the left and right spear bar linkages.

5. The sod roll picker according to claim 1, wherein each of the right guide paths intersects a corresponding left guide path.

6. A sod roll picker, comprising:
a pair of right facing spear bar assemblies and a pair of left facing spear bar assemblies, each of the right and left facing spear bar assemblies including:
a spear bar;
a plurality of spears secured to the spear bar; and
a guide roller disposed on each end of the spear bar assembly; and
a base frame, including:
a pair of sidewalls connected by a pair of end walls, each end wall including a pair of right guide paths configured to receive the guide rollers of the right facing spear bar assemblies and a pair of left guide paths configured to receive the guide rollers of the left facing spear bar assemblies;
a right spear bar linkage interconnecting the right facing spear bar assemblies; and
a left spear bar linkage interconnecting the left facing spear bar assemblies.

7. The sod roll picker according to claim 6, further comprising a pair of spear guide plates supported on the base frame.

8. The sod roll picker according to claim 7, further comprising an actuator connected to each of the left and right spear bar linkages.

9. The sod roll picker according to claim 8, wherein each of the right guide paths intersects a corresponding left guide path.

10. The sod roll picker according to claim 9, wherein the right guide paths intersects the left guide paths at an enlarged region sized and configured to receive the guide rollers.

11. A sod roll picker, comprising:
a pair of right facing spear bar assemblies and a pair of left facing spear bar assemblies, each of the right and left facing spear bar assemblies including:
a spear bar;
a plurality of spears secured to the spear bar; and
a guide roller disposed on each end of the spear bar assembly; and
a base frame, including:
a pair of spaced apart end walls, each end wall including a pair of right guide paths configured to receive the guide rollers of the right facing spear bar assemblies and a pair of left guide paths configured to receive the guide rollers of the left facing spear bar assemblies, wherein each of the right guide paths intersects a corresponding left guide path at an enlarged region;
a right spear bar linkage interconnecting the right facing spear bar assemblies; and
a left spear bar linkage interconnecting the left facing spear bar assemblies.

12. The sod roll picker according to claim 11, further comprising a pair of spear guide plates supported on the base frame, guide plate configured to receive the spears of a respective pair of spear bar assemblies.

13. The sod roll picker according to claim 12, further comprising an actuator connected each of the left and right spear bar linkages.

14. The sod roll picker according to claim 11, wherein each guide roller includes a pair of shoulders with a channel therebetween.

* * * * *